No. 854,694. PATENTED MAY 21, 1907.
C. H. HAESELER & A. H. TAYLOR.
PORTABLE PNEUMATIC TOOL.
APPLICATION FILED DEC. 8, 1906.

Witnesses
Max W. A. Doring.
Lillie Cass.

Charles H. Haeseler &
Albert H. Taylor
Inventors,
By Prindle and Williamson
Attorneys No. 854,694. PATENTED MAY 21, 1907.
C. H. HAESELER & A. H. TAYLOR.
PORTABLE PNEUMATIC TOOL.
APPLICATION FILED DEC. 8, 1906.

Witnesses
Max B. A. Porting.
Lillie Cass

Charles H. Haeseler, and
Albert H. Taylor,
Inventors

By Prindle and Williamson
Attorneys

No. 854,694. PATENTED MAY 21, 1907.
C. H. HAESELER & A. H. TAYLOR.
PORTABLE PNEUMATIC TOOL.
APPLICATION FILED DEC. 8, 1906.

Witnesses
Max B. Doring.
Lillie Cuss.

Charles H. Haeseler and
Albert H. Taylor,
Inventors

By Attorneys
Prindle and Williamson.

No. 854,694. PATENTED MAY 21, 1907.
C. H. HAESELER & A. H. TAYLOR.
PORTABLE PNEUMATIC TOOL.
APPLICATION FILED DEC. 8, 1906.

Witnesses
Mab B. A Doring.
Lillie Cass

Charles H. Haeseler, and
Albert H. Taylor,
Inventors

By Attorneys
Prindle and Williamson.

No. 854,694. PATENTED MAY 21, 1907.
C. H. HAESELER & A. H. TAYLOR.
PORTABLE PNEUMATIC TOOL.
APPLICATION FILED DEC. 8, 1906.

Witnesses
Max P. A. Doring.
Lillie Cass

Charles H. Haeseler and
Albert H. Taylor,
Inventors

By Attorneys
Prindle and Williamson.

UNITED STATES PATENT OFFICE.

CHARLES H. HAESELER, OF NEW YORK, N. Y., AND ALBERT H. TAYLOR, OF EASTON, PENNSYLVANIA, ASSIGNORS TO INGERSOLL-RAND COMPANY, A CORPORATION OF NEW JERSEY.

PORTABLE PNEUMATIC TOOL.

No. 854,694.  Specification of Letters Patent.  Patented May 21, 1907.

Application filed December 8, 1906. Serial No. 346,969.

*To all whom it may concern:*

Be it known that we, CHARLES H. HAESELER, of New York city, in the county of New York and State of New York, and ALBERT H. TAYLOR, of Easton, in the county of Northampton, and in the State of Pennsylvania, have invented a certain new and useful Improvement in a Portable Pneumatic Tool; and we do hereby declare that the following is a full, clear, and exact description thereof, reference being had to the accompanying drawings, in which—

The object of our invention has been to provide a pneumatic tool which has, among others, any or all of the following advantages: That of being so constructed that it cannot be forced to run when it is not in condition to run, such as, when it lacks lubrication, or is clogged with dirt or oil. That of indicating which of its valves is out of order, when such condition exists. That of having few and easily manufactured parts. That of having a casing which is simple and composed of few parts. That of affording easy access to the crank-shaft and to its attached parts; and to such ends our invention consists in the portable pneumatic tool hereinafter specified.

In the accompanying drawings we have illustrated what we consider the best embodiment yet known to us of our invention, but we are aware that the principles of our invention are capable of embodiment in other forms. In such embodiment, our invention is applied to a pneumatic drill, but it is to be understood that the invention is equally applicable to any portable fluid motor for rotating a tool.

Figure 1:
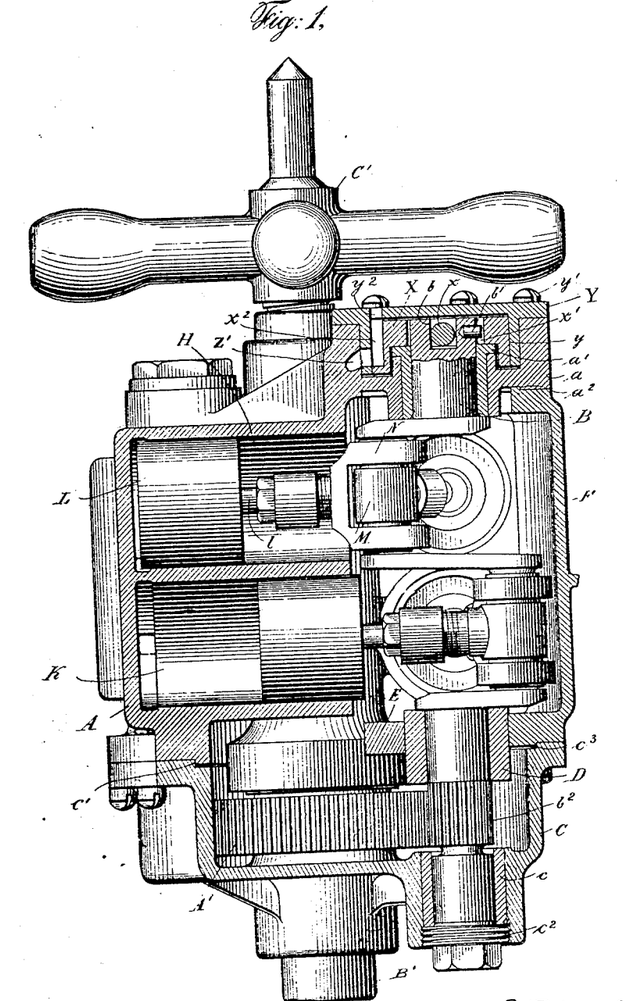
Figure 1 is a vertical, sectional view of a pneumatic drill embodying our invention, taken on the line 1—1 of Fig. 2.
Figure 2:
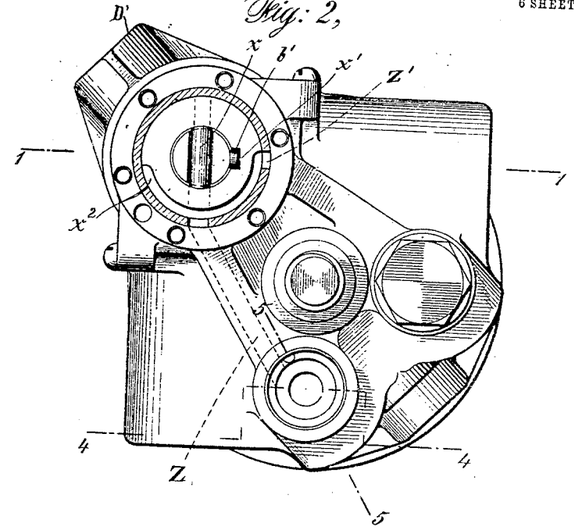
Fig. 2 is a top plan view of the construction illustrated in Fig. 1, the valve-cap being removed to show the controlling valve.
Figure 3:
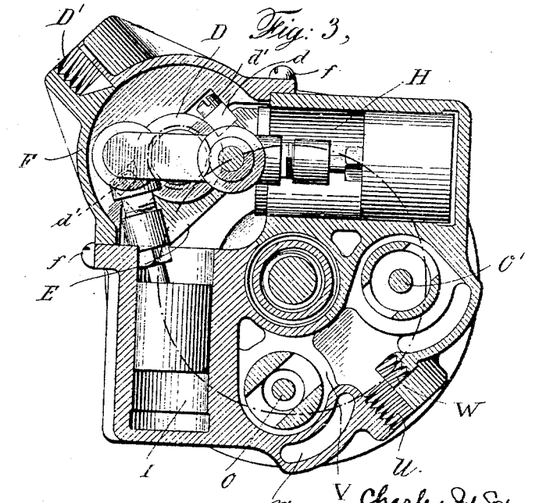
Fig. 3 is a horizontal, sectional view taken on the lines 3—3 and 3'—3' of Fig. 4.
Figure 4:
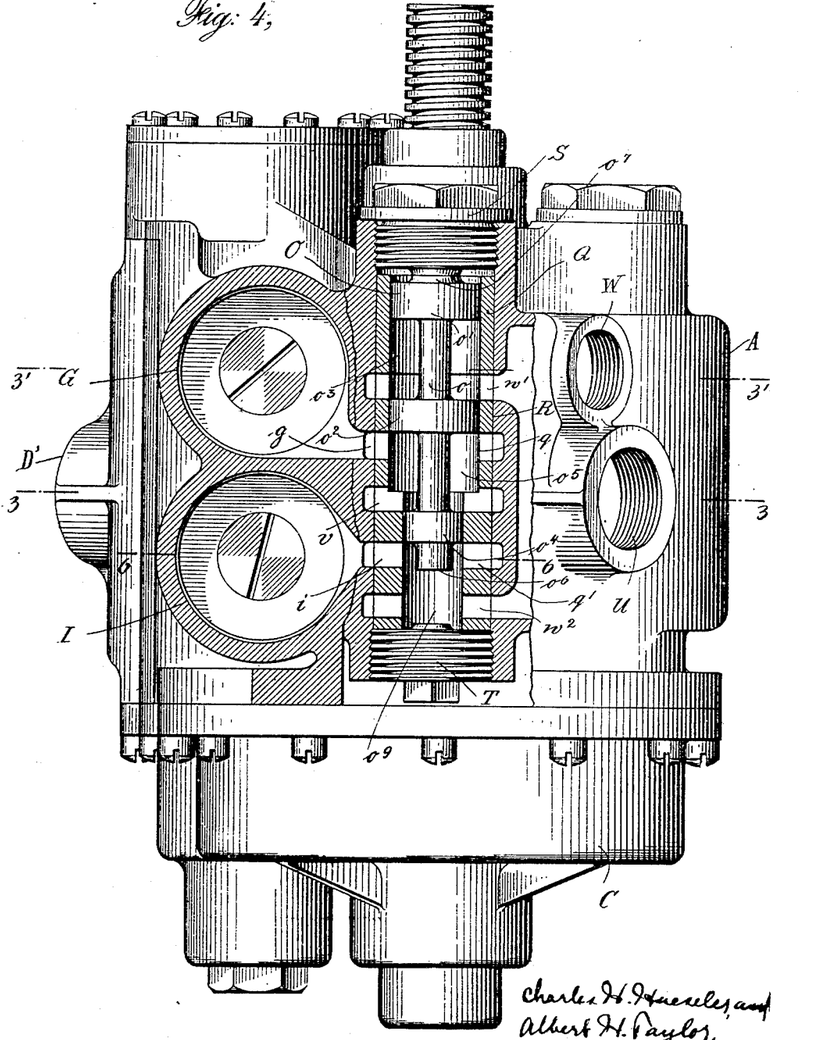
Fig. 4 is a vertical, sectional view taken on the line 4—4 of Fig. 2.
Figure 5:
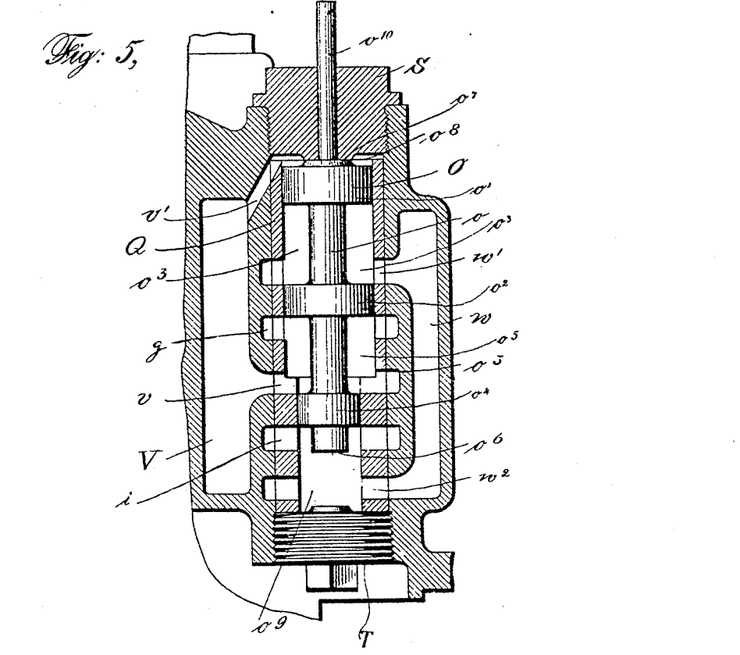
Fig. 5 is a detail, vertical, sectional view, taken on the line 5—5 of Fig. 2.
Figure 6:
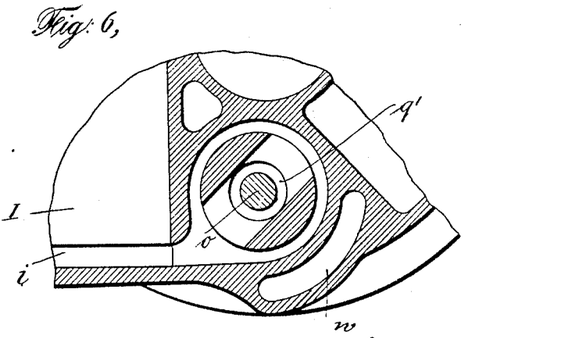
Fig. 6 is a detail, sectional view, taken on the line 6—6 of Fig. 4.

The pneumatic drill consists of a casing comprising a body A having an end-wall $a$ in which is mounted a bushing $a'$, that forms a bearing for the crank-shaft B. The opposite end of the crank-shaft bears in a bushing $c$ which is secured in a cap C that is held by screws to the end of the casing opposite the end-wall $a$. The said cap has a recess or rabbet $c'$ fitting over a projection on the casing. The bushing $c$ is closed by a cap-screw $c^2$. The crank-shaft also has a bearing in a bushing D having ears $d$ by which it is secured by screws $d'$ to a suitably shaped seat formed in a web E extending across the right hand end of the casing, as seen in Fig. 3. The casing is closed by a cap F extending over the crank-shaft and secured by screws $f$ to the casing-body A. The end-wall $a$ of the casing, and the cap C are respectively provided with rabbets $a^2$ and $c^3$ which fit over corresponding projections on the cap F.

The crank-shaft has two cranks 180 degrees apart that are connected to the pistons of four cylinders that are arranged in two pairs, the cylinders of each pair being connected to the same crank, and being arranged at right angles to each other, so that the crank-shaft receives four separate impulses 90 degrees apart. For convenience the cylinders G and H will be termed the upper pair of cylinders, and the cylinders I and K the lower pair of cylinders. Each cylinder has a single-acting piston L having its connecting rod $l$ pivoted within the piston in the usual manner. The straps M and N of the connecting rods of the respective cylinders of each pair engage the same crank-pin, the strap N being forked to straddle the strap M. The closed ends of the cylinder are preferably formed of the casing, for simplicity.

The exhaust and supply of air of the cylinders G and I is controlled by a cylindrical valve O that is mounted in the casing-body A parallel to the crank-shaft, and the admission and exhaust of the cylinders H and K is likewise controlled by a valve O' similarly mounted in the casing adjacent to the said cylinders. The valve O consists of a stem $o$ having at its upper end two disks $o'$ and $o^2$ forming between them a neck or chamber $o^3$. It also has a smaller disk $o^4$ near the lower end of the stem, thus forming a neck or chamber $o^5$ between it and the disk $o^2$. A stud $o^6$ projects below the disk $o^4$ so that the said disk can never reach the bottom of the valve-chamber. Similarly a stud $o^7$ projects from the upper side of the disk $o'$ to prevent it from reaching the top of the chamber. All of the parts of the valve are preferably formed from one piece of steel. The valve is preferably mounted in a brass lining Q that is driven into a cylindrical hole R formed in the casing-body. The disks $o'$ and $o^2$ play in a bore $q$ of larger diameter, and the disk $o^4$ plays in a bore $q'$ of smaller diameter. The upper and lower ends of the valve-chamber are respectively closed by screw-plugs S and T. Live air enters through a hose screwed into a hole U formed in the casing-body and fills a chamber V that communicates with the bores $q$ and $q'$ by a port $v$. The cylinder I communicates with the bore $q'$ by a port $i$, and the cylinder G communicates with the bore $q$ by a port $g$. The exhaust takes place through an opening W in the casing-body, which opening communicates with a chamber $w$ that is connected with the bore $q$ by a port $w'$ and with the bore $q'$ by a port $w^2$. The valve $O'$, controlling the cylinders H and K, is precisely like the valve O, and it is therefore unnecessary to describe it in detail.

Communication between the bores $q$ and $q'$ of the valve $O'$ and the cylinders H and K, respectively, is afforded by means of ports $h$ and $k$. Each valve has a stem $o^{10}$ extending through a hole in the screw-plug S for a purpose to be later explained. A port $v'$ admits live air from the chamber V to a chamber $o^8$ formed in the upper end of the bore $q$ owing to the presence of the projection $o^7$, and a chamber $o^9$ always exists at the lower end of the valve owing to the presence of the projection $o^6$, and is always open to the atmosphere.

In order to control the position of the valves, the following means are provided:

The upper end of the crank-shaft has a slot $b$ that receives a pin $x$ which is driven through a circular valve X so that the said valve will be rotated with the shaft. The valve is provided with ports to be later described, and in order that it may be placed upon the end of the crank-shaft always in the same position, (the pin $x$ being capable of engaging the said shaft in either of two positions half a circle apart) a pin $b'$ is driven into the shaft, and the valve has a notch $x'$ that is adapted to fit over the said pin. Thus the valve can be engaged with the shaft only in one position. The valve has a turning fit in a sleeve $y$ forming part of a cap Y that is driven into a bore concentric with the crank-shaft and formed in the casing-body A, the cap being secured in place by screws $y'$. The valve X has a port $x^2$ which extends about half way round the circumference. A port Z extends from the chamber $o^8$ of the valve O to the valve X and when in communication with the port $x^2$ exhausts through a port $y^2$ in the cap Y. Similarly a port $Z'$ extends from the chamber $o^8$ of the valve $O'$, the exits of the ports Z and $Z'$ being one-quarter of a circle apart.

The crank-shaft has a pinion $b^2$ between the bushings D and $c$, the said pinion being preferably integral with the shaft, and of not larger diameter than the journals in the said bushings, so that the bushing D can be slipped over the pinion in place on the shaft. The pinion $b^2$ engages a gear $A'$ which is mounted on the drill-shaft $B'$ as usual in pneumatic drills. At the upper end of the drill-shaft is the usual screw feed mechanism $C'$ which need not be described in detail. The cap F may have a socket $D'$ for the insertion of a handle as usual.

Figures 7, 9:
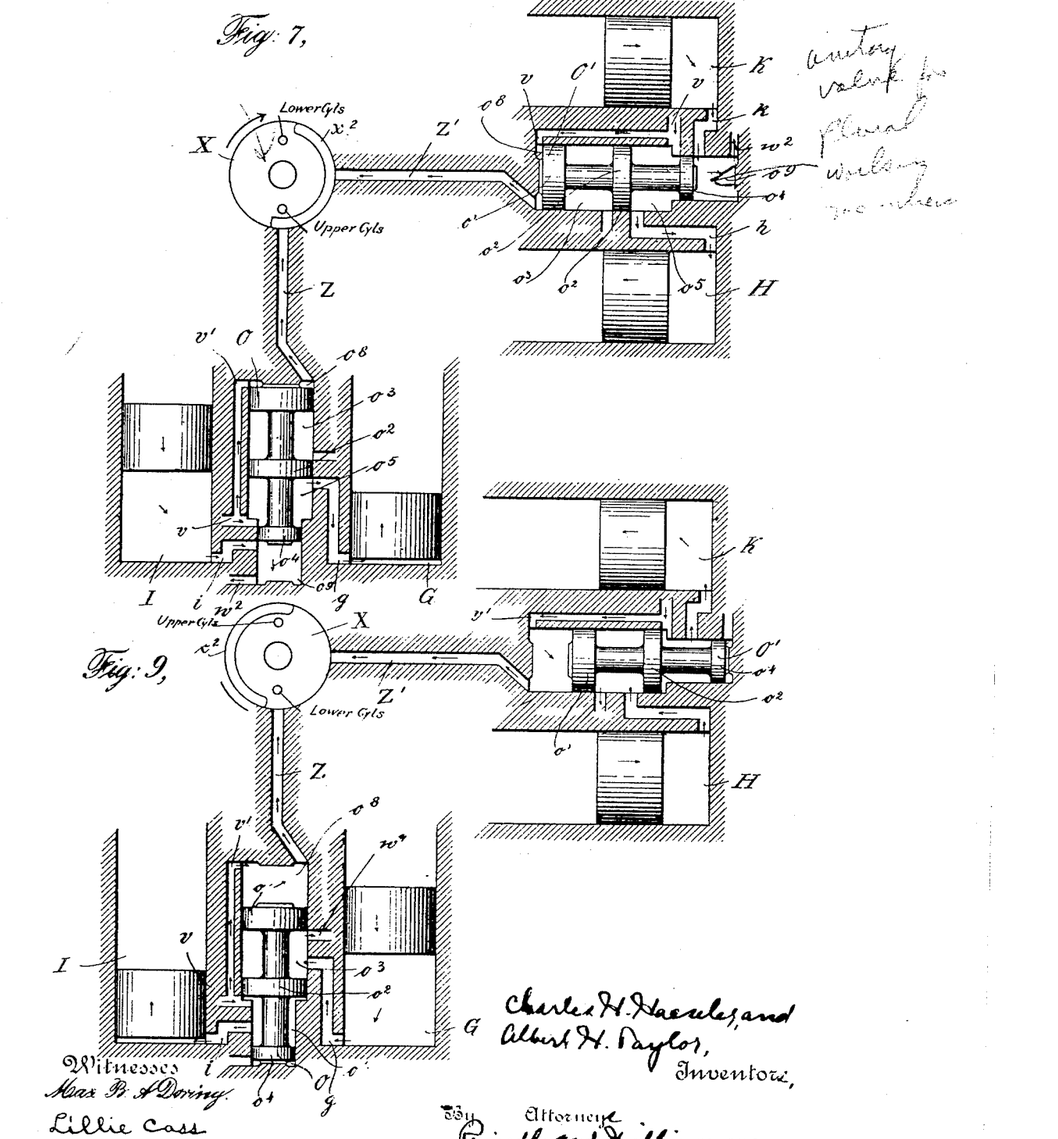
Figs. 7 to 10 inclusive, are diagrammatic views, showing the cycle of operations of the valves and pistons.

In the operation of our motor as illustrated diagrammatically in Figs. 7 to 10 respectively, assuming the parts to be in the position shown in Fig. 7, air being admitted, enters through the ports $v$ of the valves O and $O'$ into the chambers $o^5$ and it also enters through the ports $v'$ into the chambers $o^8$ above each of the said valves. The pressure from the chambers $o^8$ escapes through the respective ports Z and $Z'$. As the air is not confined in the chambers $o^8$ there is no resistance to the pressure in the chambers $o^5$ against the under surfaces of the disk $o^2$, and the said surfaces being larger than the upper surfaces of the disks $o^4$, the valves are held in the positions shown in Fig. 7. In these positions, air passes from the chamber $o^5$ of the valve O through the port $g$ into the cylinder G, forcing the piston forward. The air from the cylinder I escapes through the port $i$ beneath the disk $o^4$ into the chamber $o^9$ beneath the valve, and through the port $w^2$ to the chamber $w$ and out through the opening W. The air from the cylinder K exhausts through the passage $k$ into the chamber $o^9$ under the valve $O'$ and through the corresponding exhaust port $w^2$ into the chamber $w$ and through the opening W.

Figures 8, 10:
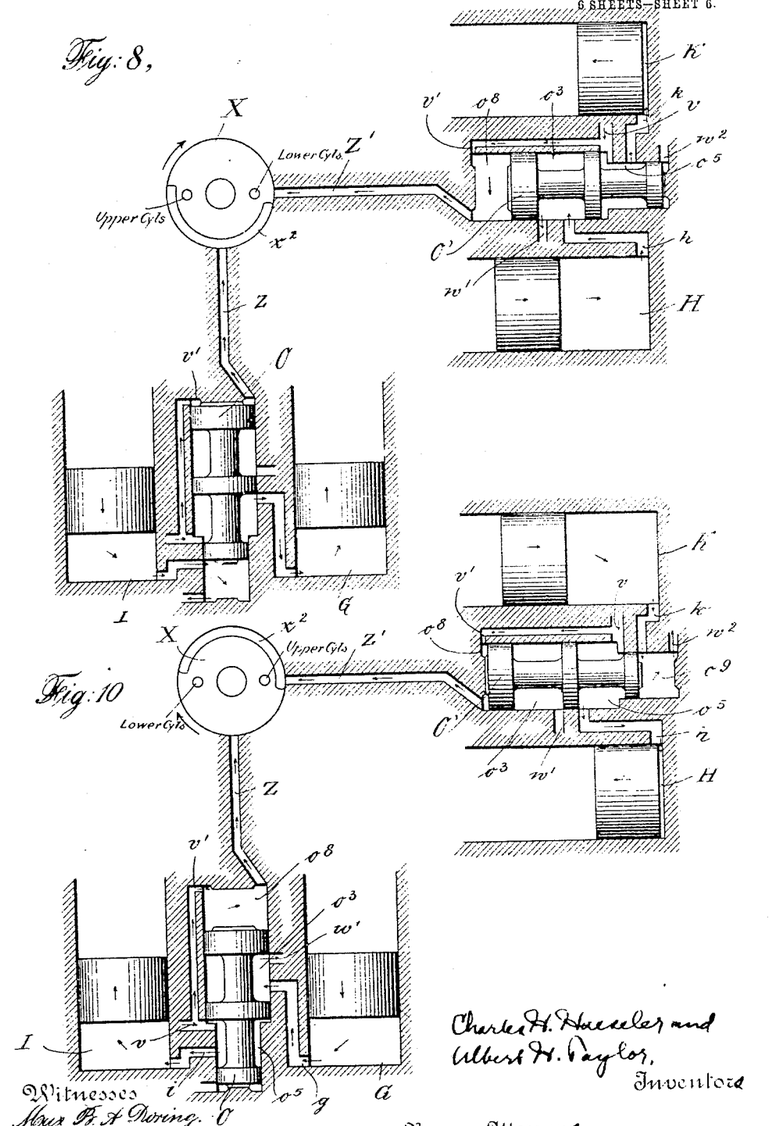

When the crank-shaft has made one-quarter of a revolution, the parts will be in the position shown in Fig. 8, in which exhaust from the chamber $o^8$ above the valve $O'$ will be prevented from taking place through the port $Z'$, because the turning of the valve X will have caused the port $x^2$ to have passed beyond the port $Z'$. This will cause the pressure to build up in the said chamber $o^8$ of the valve $O'$, and as the exposed area in the said chamber $o^8$ is greater than the unbalanced area in the chamber $o^5$ (which is the difference between the exposed areas of the disks $o^2$ and $o^4$) the valve $O'$ will be forced to the position shown in Fig. 8, and held in such position by the pressure, the valve O remaining in the position of Fig. 7. This reverses the flow of air in the cylinders H and K. Cylinder H is now open to exhaust through the port $h$, chamber $o^3$ and exhaust port $w'$. At the same time the cylinder K receives air from the supply port $v$ through the chamber $o^5$ and the port $k$. The direction of movement of air in the cylinders I and G is, of course, not changed as yet. When the valve X has passed through another quarter turn, it will, as shown in Fig. 9, close the port Z as well as the port $Z'$. This will not disturb the position of the valve $O'$, nor the direction of flow in the cylinders H and K, but, by preventing exhaust from the chamber $o^8$ above the valve O, it will cause pressure to build up in the said chamber, and, as the exposed area of the valve in said chamber is greater than the unbalanced area in the chamber $o^5$, the valve O will be forced to the position illustrated in Fig. 9. In this position the cylinder I will receive air from the port $v$ by way of the chamber $o^5$ and the port $i$, while the cylinder G will exhaust through the port $g$, chamber $o^3$ and the exhaust port $w'$.

When the valve X revolves another quarter turn to the position of Fig. 10, the port $x^2$ will communicate with the port $Z'$ and exhaust the chamber $o^8$ of the valve $O'$, permitting the pressure on the unbalanced area in the chamber $o^5$ to force the valve to the position shown in Fig. 10. In this position of the valve, the chamber K will exhaust through the port $k$, chamber $o^9$ and exhaust port $w^2$, while the cylinder H will receive live air from the port $v$ through the chamber $o^5$ and the port $h$. During this quarter of a turn, the conditions of the cylinders I and G are not changed. The next quarter of a turn of the valve X will bring the parts to the position shown in Fig. 7, when the cycle will be repeated.

It will be observed that our pneumatic tool has the following advantages: In the portable pneumatic drilling machines employed heretofore, the valves controlling the movements of the pistons have been operated by mechanical connections from the crank-shaft, usually by means of eccentrics and eccentric rods or gears. Such valve-operating-mechanism results in a gradual opening and closing of the admission and exhaust ports connected with the cylinders for admitting the motive fluid to force the engine pistons back and forth. While this is desirable to obtain a proper expansive action in large engines, because of the necessity for economy in the use of the fluid, it is, on the contrary, highly desirable in a portable fluid-actuated tool, such as a pneumatic drill, to obtain a full admission and full exhaust as quickly as possible, because in such a tool it is much more desirable to obtain a maximum amount of power for a given weight of motor by using the full pressure of the fluid throughout the entire length of stroke of the piston, than it is to use the expansive action of the fluid for economy's sake. By the use of the fluid-actuated or air-thrown valve which we employ, the movement for its full travel is practically instantaneous as soon as the pressure is either reduced or maintained by means of the auxiliary valve on the main crank-shaft. Further, as portable pneumatic drills are usually operated by rough, unskilled, careless workmen, who do not understand the necessity of keeping such a high speed motor lubricated at all times, it is a great advantage to have provided a construction that will not operate unless the entire mechanism is in good condition, especially as regards cleanliness and lubrication. This advantage we have obtained in the use of the air-thrown valve. The valves are the most sensitive part of the entire construction, and most likely to cease to operate. The air must enter the valves before it can reach the cylinders, and therefore any scale or dirt or other foreign substance that may be carried in with the air is likely to lodge in the valve-chamber, rather than to be carried into the cylinders. Also, as the valves are smaller than the pistons, they are more likely to stick for want of oil or because they are gummed up or rusted from not having been in constant use, or from exposure. Consequently, if the machine can be depended upon to refuse to work when the valves are out of order, it is a great protection to the entire mechanism. As our valves are operated by means of air pressure, and have no mechanical connection with the driving-shaft, they will cease to work unless the mechanism is well oiled and clean; and, therefore, the machine is protected from the serious injury that frequently results from working such a tool after it needs lubrication or is out of order, and so long as the parts will work.

In all other portable pneumatic drills, so far as we know, if the machine stops, it cannot be told without taking the machine apart, which of the several valves is out of order. By the provision of the stems $o^{10}$ on each valve, the movements of the valve can be seen without taking the machine apart at all, and it can therefore, be told which valve is not operating, so that it will only be necessary to take out the one valve that is in trouble. This can be done by simply removing the screw-cap S of the particular valve needing attention. Such stems also enable the valves to be moved by hand, a procedure that will often disclose the obstruction.

The use of air to operate the valves eliminates all eccentrics, eccentric rods and straps, or other form of gearing for operating the valves, and affords an extremely desirable simplicity. The casing of our pneumatic tool is very simple, being made of only three parts; the body A, and the caps C and F. The cylinder-heads are cast in one piece with the casing-body. Access to all the interior parts of the mechanism is obtained by simply removing the caps C and F.

We are aware that our invention can be embodied in other forms, and we do not wish to be restricted beyond the requirements of the prior art and the terms of our claims.

Having thus described our invention, we claim—

1. In a portable pneumatic motor, the combination of a crank shaft, a cylinder, a piston, and connections for turning said shaft, a fluid-actuated valve for controlling the admission and exhaust of fluid to said cylinder, and a rotating valve connected with said shaft for controlling the fluid actuating said first-mentioned valve.

2. In a portable pneumatic motor, the combination of a shaft, means for rotating said shaft by fluid pressure comprising a cylinder, a valve for controlling said means for rotating said shaft, mechanical means exterior to said cylinder for governing the movements of said valve, and a fluid connection between said means and said valve.

3. In a portable pneumatic motor, the combination of a crank-shaft, a cylinder, a piston, and connections for turning said shaft, a valve for controlling the admission and exhaust of fluid to said cylinder, mechanical means exterior to said cylinder for governing the movements of said valve, and a fluid connection between said means and said valve, the fluid pressure of said connection being maintained during the whole of the time the valve is desired to be in a given position.

4. In a portable pneumatic motor, the combination of a crank-shaft, a cylinder, a piston, and connections for turning said shaft, a fluid-actuated valve for controlling the admission of fluid to said cylinder, ports governing the flow to said valve of the fluid for actuating it, and a rotating valve connected with said crank-shaft for controlling said ports.

5. In a portable pneumatic motor, the combination of a crank-shaft, a cylinder, a piston, and connections for turning said shaft, a valve for controlling the admission of fluid to said cylinder, said valve having surfaces such that, when fluid pressure is applied thereto, the valve will be shifted, ports governing the flow of fluid to and from said surfaces, and a rotating valve connected with the crank-shaft for controlling said ports.

6. In a portable pneumatic motor, the combination of a crank-shaft, a cylinder, a piston, and connections for turning said shaft, a valve for controlling the admission of fluid to said cylinder, means whereby a difference of fluid pressure may be applied to opposite sides of said valve, and a valve connected with the crank-shaft for governing the fluid for effecting said difference of pressure.

7. In a portable pneumatic motor, the combination of a crank-shaft, a cylinder, a piston, and connections for turning said shaft, a valve for controlling the admission of fluid to said cylinder, said valve having effectively greater and lesser areas on opposite sides thereof, constantly open ports connected with the source of supply of fluid for admitting fluid to said surfaces to actuate the valve, a port for permitting the escape of fluid from said greater surface, and a valve connected with the crank-shaft for governing the last mentioned port.

8. In a portable pneumatic motor, the combination of a crank-shaft, a cylinder, a piston, and connections for turning said shaft, a valve for controlling the admission of fluid to said cylinder, said valve consisting of two cylindrical portions of different diameters, each of said portions having an annular groove therein, a valve chamber having bores corresponding to the said portions of said valve, said chamber having a port connected with said cylinder, having a supply port within the range of travel of the groove in said smaller portion of the valve, and having an exhaust port within the range of travel of the groove in the said larger portion of the valve, the end of said smaller portion of the valve being open to the atmosphere, and a valve for intermittently admitting pressure to the larger portion of said first-mentioned valve.

9. In a portable pneumatic motor, the combination of a crank-shaft, a cylinder, a piston, and connections for turning said shaft, a valve for controlling the admission of fluid to said cylinder, said valve consisting of two cylindrical portions of different diameters, each of said portions having an annular groove formed therein, a valve chamber having bores corresponding to said portions of the valve, said chamber having a port connected with said cylinder, and having supply and exhaust ports respectively within the range of travel of the grooves in said smaller and larger portions of the valve, the end of the smaller portion of the valve being open to the atmosphere, a supply port connected with the opposite end of the valve chamber, an exhaust port connected with the said end of the valve chamber, and a valve connected with the crank-shaft for controlling said last mentioned exhaust ports.

10. In a portable pneumatic motor, the combination of a crank-shaft, two cylinders, pistons therein, and connections for turning said shaft, a valve for controlling the admission of fluid to said cylinders, said valve consisting of two cylindrical portions of different diameters, each of said portions having an annular groove therein, a valve chamber having bores corresponding to said portions of said valve, said chamber having a port within the range of travel of said smaller groove, that is connected with one of said cylinders, and having a port adjacent to the smaller end of the valve, but not covered thereby in one extreme position, which port is connected with the other of said cylinders, said chamber having supply and exhaust ports which are respectively within the range of travel of said smaller and larger grooves, the end of said smaller portion of the valve being open to the atmosphere, the opposite end of the said valve chamber being connected with the fluid supply by a port, said end of the valve chamber also having an exhaust port, and a valve connected with the crank-shaft for controlling said exhaust port.

11. In a portable pneumatic motor, the combination of a crank-shaft, a plurality of cylinders having pistons, and connections for turning said shaft, a valve mounted in a chamber substantially transverse to said cylinders, for controlling the admission of fluid to said cylinders, whereby the use of simple and direct ports is made possible, and means for shifting said valve to its various positions by fluid pressure.

12. In a portable pneumatic motor, the combination of a crank-shaft, a plurality of cylinders, having pistons connected with said shaft, a valve mounted in a bore transverse to said cylinders, for controlling said cylinders, whereby the use of simple and direct ports is made possible, and means for shifting to and maintaining said valve in its various positions by fluid pressure.

13. In a portable pneumatic motor, the combination of a crank-shaft, cylinders placed at different angles to said shaft, pistons and connections for operating said shaft, a fluid-actuated valve for controlling the admission of fluid to the cylinders at a given angle, and a valve on the crank shaft for governing the flow of fluid to actuate said valves.

14. In a portable fluid motor, the combination of a crank-shaft, cylinders placed at different angles to said shaft, pistons and connections for operating said shaft, a fluid actuated valve for the cylinders at each of said angles, ports leading from said valve-chamber to a port concentric with the crank-shaft, and a valve rotating with said crank-shaft for governing said ports to control said valves, said valve rotating with the crank-shaft having a peripheral groove of an angular extent corresponding to the angle between said cylinders for controlling said ports.

15. In a portable pneumatic motor, the combination of a crank-shaft, cylinders at different angles to said shaft, pistons and connections for operating said shaft, a fluid-actuated valve for the cylinders at each of said angles, ports leading from said valve-chamber to a port concentric with the crank-shaft, and a valve rotating with said crank-shaft for governing said ports to control said valves, said valve rotating with the crank-shaft having a semi-circular groove in its periphery for controlling said ports.

16. In a portable pneumatic motor, the combination of a casing, a crank-shaft mounted therein, cylinders, pistons, and connections for turning said shaft, fluid-actuated valves for controlling the admission of fluid to said cylinders, and a valve for controlling the fluid for actuating said valve, said last mentioned valve consisting of a cylindrical sleeve having a cross-pin that is adapted to be received in a slot in the end of the crank-shaft, said sleeve rotating within a ported bore in the casing.

17. In a portable pneumatic motor, the combination of a casing, a crank-shaft mounted therein, cylinders, pistons, and connections for turning said shaft, fluid-actuated valves for controlling the admission of fluid to said cylinders, and a valve for controlling the fluid for actuating said valve, said last mentioned valve consisting of a cylindrical sleeve having a cross-pin that is adapted to be received in a slot in the end of the crank-shaft, said sleeve rotating within a ported bore in the casing, and a pin and groove, one of which is on said last mentioned valve, and the other of which is on said crank-shaft, for insuring that said valve will be properly positioned on said crank-shaft.

18. In a portable pneumatic motor, the combination of a crank shaft, cylinders and pistons for rotating said crank shaft, a plurality of fluid-actuated valves for controlling said cylinders, and a mechanically actuated master-valve for controlling the fluid actuating said first mentioned valves.

19. In a portable pneumatic motor, the combination of a crank-shaft, cylinders and pistons for rotating said shaft, fluid-actuated valves controlling fluid for said cylinders, a rotating valve controlling the fluid for actuating said first-mentioned valves, said last-mentioned valve being loosely mounted on said crank-shaft to rotate therewith, and a removable bushing in which said last-mentioned valve rotates.

20. In a portable pneumatic motor, the combination of a crank-shaft, fluid-operated means for rotating said crank-shaft, a valve for controlling the admission of fluid to said means, and means controlled by the crank-shaft for actuating said valve, said means comprising a mechanical element and a fluid element in series, whereby a mechanical connection between the shaft and valve is avoided.

21. In a portable pneumatic motor, the combination of a crank-shaft, a plurality of cylinders for rotating said crank-shaft, valves for controlling the admission of fluid to said cylinders, and means controlled by the crank-shaft for actuating said valves, said means comprising a mechanical element and a fluid element in series, whereby mechanical connections between the shaft and valves is avoided.

In testimony that we claim the foregoing we have hereunto set our hands.

CHARLES H. HAESELER.
ALBERT H. TAYLOR.

Witnesses to C. H. Haeseler:
  EDGAR L. DAVIS,
  WILLIAM H. ARMSTRONG.
Witnesses to A. H. Taylor:
  RUSSELL H. WILHELM,
  CHAS. S. KREBS.